United States Patent Office 3,431,103
Patented Mar. 4, 1969

3,431,103
PROCESS FOR THE MANUFACTURE OF FERROSILICON
Hugo Querengasser, Hermulheim, near Cologne, Johannes Krause, Knapsack, near Cologne, Klaus Frank, Hermulheim, near Cologne, and Johann Cziska, Hurth, near Cologne, Germany, assignors to Knapsack Aktiengesellschaft, Knapsack, near Cologne, Germany, a corporation of Germany
No Drawing. Filed Mar. 2, 1966, Ser. No. 531,070
Claims priority, application Germany, Mar. 11, 1965, K 55,505
U.S. Cl. 75—133  14 Claims
Int. Cl. C22c 1/10, 1/04, 1/02

ABSTRACT OF THE DISCLOSURE

A process for producing ferrosilicon by introducing and treating quartz, carbon and iron in a reduction furnace, whereby at least the quartz and carbon components are introduced in the form of briquettes or pellets whose carbon component consists of
(A) Coal having a caking capacity of 4–10 and
(B) Non-caking coal or non-caking coke, the ratio of (A) to (B) being about 2:1 to 1:5.

---

The present invention relates to a process for the manufacture of ferrosilicon from iron turnings or chips, quartz, and carbon in a reduction furnace.

It is known that ferrosilicon can be produced in reduction furnaces with the use of shaped starting materials which are required to have both a good low temperature and high temperature strength.

Attempts have already been made with the object of obtaining pellets which in addition to 3–10% cement, that serves as a binding agent, contain pulverulent iron oxide and all the carbon in the form of crude caking coal with a swelling index of more than 3. Pellets of this type are allowed to harden first. To this end, they are stored while cold before subjecting them in a shaft or rotary furnace to pre-baking treatment intended to coke the caking coal and to confer the necessary high temperature strength upon the shapes. This procedure entrains some disadvantages. It firstly means great expenditure of energy and an additional processing step when, before use in the furnace, the shapes must undergo coking and pre-reduction, and secondly it is impossible in this manner to obtain pure ferrosilicon. The use of cement as the binding agent results in large amounts of contaminants, particularly aluminum, being introduced into the production process. Furthermore, iron oxide is less suitable than iron turnings or chips for making especially high grade pure ferrosilicon. Still further, very long hardening times are necessary to confer upon the pellets the low temperature strength required for pre-baking treatment in a shaft or rotary furnace.

It is also known art that sandy or pulverulent materials with carbon as the reducing agent can be brought into briquet form for use in electrothermal reduction processes. To this end, all or a portion of the carbon serving as the reducing agent, which from the onset has incorporated therewith the content of binding agents, including oily or tarry constituents, necessary to obtain stable pellets, is mixed with fine-grained starting materials and made into shapes. These are conveniently briquetted, coked subsequently, and the coked shapes are ultimately used in the electric furnace. This process again has the drawback that before their being used in the electric furnace the briquets forming the furnace mixture must be coked since they fail to have the necessary strength without being so pretreated.

Still further, it is generally known that mixtures for use in reduction furnaces can be briquetted with the aid of a binding agent such, for example, as sulfite waste liquor or water-glass. However, the binding strength of those binding agents is found to decrease considerably once the briquets are heated at higher temperatures, which means that shapes so prepared decompose at temperatures above about 350° C. into their initial dusty constituents.

Shapes in which all the carbon is in the form of coal capable of being caked, cannot be used unless they have been precoked, as uncoked shapes would soften or even fuse and agglomerate into large lumps as a result of the slow and heterogeneous heating the material charged to the furnace undergoes.

The present invention provides a process for making ferrosilicon from iron turnings or chips, quartz, and carbon in a reduction furnace, wherein the quartz and the carbon, which are used alone or in admixture with at least a portion of the iron turnings or chips, are made by means of a conventional binding agent into shapes, the carbon being formed of a mixture of coal with a caking capacity of 4–10, preferably 5–7, determined after Campredon and Dunn, and being formed of noncaking coal or coke in the ratio by weight of 2:1 to 1:5, and wherein the shapes so made are introduced, if desired jointly with the balance iron turnings or chips, into the reduction furnace for use as the burden therein.

As taught by Campredon and Dunn (Sinnersbach and Schneider "Koks Chemie," edited by Julius Springer, 1930, p. 281), the caking capacity is determined by admixing finely pulverized coal with pure dry and fine-grained sand and determining then the maximum weight of sand with which the coal can still be caked. The weight of the coal is taken as unity, the caking capacity being expressed by the weight of the sand.

The caking capacity of coal is a function of its structural constituents, which include vitrite, clarite, durite, fusite. These differ substantially in their caking capacity. Vitrite has a caking capacity essentially greater than that of clarite, but durite and fusite have none though they fail to differ widely as regards the contents of oily or tarry constituents. In other words, the type of coal used for making the shapes is anything else than immaterial, provided that those shapes, while omitting subsequent coking, shall have or reach in the process the high temperature strength enabling them to withstand the stress of the reduction process. The coal used is therefore required to contain vitrite or clarite as structural constituents.

It has unexpectedly been found that quartz and carbon briquetted in accordance with the present invention enable the production of ferrosilicon to be simplified quite substantially.

High temperature binding agents, such as bituminous substances and caking coal, as used heretofore have necessitated subjecting the shapes to low temperature carbonization, which preceded their use in the furnace and was intended to confer upon these shapes the necessary high temperature strength. It has now been found that briquets suitable for use in the furnace can be obtained by the appropriate selection of coal quality and determined mixing ratios for caking to non-caking coal or coke. Although low temperature carbonization is omitted, the briquets so made do neither decompose or agglomerate in the furnace at higher temperatures as the heat prevailing therein finally strengthens the briquets at temperatures above 350° C.

It could not be foreseen that uniform and carefully controlled heat treatment and low temperature carbonization are procedures unnecessary for obtaining shapes having the demanded strength. Nor could it be foreseen that shapes having very good strength properties can be obtained inside the furnace although briquets allowed to set while cold and intended for direct use in the ferrosilicon furnace may require different heating periods which may vary within wide limits. Briquets charged in the immediate neighborhood of electrodes are very rapidly heated firstly by issuing reaction gas and secondly by the mixture rapidly sliding down into the reaction zone. In other words, they have only a short period of time within which to reach the necessary strength, while they must not display disadvantageous properties, such as tendency to agglomeration and decomposition. On the other hand, while much longer heating periods are reserved to those briquets which are charged near the rim portions of the furnace, these fail again to tend to decomposition or agglomeration.

In producing the shapes, it is advantageous to use the carbon carriers in the form of grains having a size of less than 6 mm., preferably and about 50% proportion in the form of grains having a size of less than 1 mm., and the balance in the form of grains having a size of 1–6 mm. About half the quantity of quartz should have a grain size smaller than 2 mm., preferably smaller than 1 mm., and the balance quartz should have a grain size within the range of 2–5 mm. The quartz used in the form of grains having a size of 2–5 mm. is most conveniently crushed rock quartz, whose irregular and sharp-edged grains ensure that the individual particles interlock during briquetting.

The grain structure described above should not be adhered to in the event of the shapes being made on a briquetting press under a pressure of more than 4 tons per cm. roller width, because the coarse-edged quartz will then result in wear to the compression molds. In this case, the quartz should be used in the form of grains having a size smaller than 2 mm., and preferably an at least 50% proportion thereof should be used in the form of grains having a size of 0.06–0.6 mm.

The finer-grained starting materials assist in the reaction for the reason that the reactants comprising quartz and carbon, which are used in stoichiometric proportions, can then be mixed even more intimately with one another. It has also been found that briquets prepared from more fine-grained material have an improved high temperature strength. Good low temperature strength is imparted to the briquets by moulding them at temperatures of about 80° C. Shapes having a good low temperature strength can be obtained using water-glass or more especially sulfite waste liquor as the binding agent; the sulfite waste liquor preferably has a strength of about 34° Bé. and is used in a proportion of 1.0 to 6.0% by weight, preferably 3.0 to 5.0% by weight. Shapes made with sulfite waste liquor have a smaller electric conductivity. The iron turnings or chips are preferably steel turnings or chips with an edge length of less than 5 mm.

The following examples show the influence of the mixing ratios of caking to noncaking coal or coke grades on the high temperature strength of shapes formed of quartz, carbon and iron turnings or chips. In order to obtain comparative data, various mixtures were made into shapes under identical conditions, exposed for 20 to 30 minutes, respectively, to temperatures of 600, 660 or 1000° C. and their breaking strength was ultimately determined.

The measurements resulted in reference data for the behaviour of various compositions of shapes at various temperatures to which the shapes are subjected in an electro-metallurgical furnace before they reach the reaction zone. The data found are comparable with each other. The breaking load determined as high temperature strength standard after heating at about 1000° C. should be higher than 150 kg. for good quality briquets.

The present invention also enables the production of carbon-ferrosilicon shapes suitable for use in the manufacture of ferrosilicon of either high or low iron content. In this event, it is merely necessary additionally to charge the furnace in accordance with the alloy composition with the respective amount of iron in the form of turnings or chips.

| Specimen No. | Composition of quartz-carbon shapes | Annealing temperature (° C.) | Sojourn time at annealing temperature (minutes) | Breaking load (kg.) | Average value of breaking load |
|---|---|---|---|---|---|
| (a) BRIQUETS | | | | | |
| 1 | 5.0% sulfite waste liquor | 600 | 30 | 45 | |
| 2 | 63.4% quartz sand | 600 | 30 | 27 | |
| 3 | 15.8% coke dust | 600 | 30 | 27 | 41.2 |
| 4 | 15.8% anthracite dust | 600 | 30 | 58 | |
| 5 | | 600 | 30 | 49 | |
| 6 | 5.0% sulfite waste liquor | 1,000 | 30 | 7 | |
| 7 | 63.4% quartz sand | 1,000 | 30 | 9 | |
| 8 | 15.8% coke dust | 1,000 | 30 | 12 | 8.4 |
| 9 | 15.8% anthracite | 1,000 | 30 | 6 | |
| 10 | | 1,000 | 30 | 8 | |
| 11 | 5.0% sulfite waste liquor | 600 | 30 | 363 | |
| 12 | 63.4% quartz sand | 600 | 30 | 315 | |
| 13 | 15.8% coke dust | 600 | 30 | 181 | 263.4 |
| 14 | 15.8% coal (0–6 mm.) | 600 | 30 | 140 | |
| 15 | | 600 | 30 | 183 | |
| 16 | 6.8% sulfite waste liquor | 600 | 20 | 431 | |
| 17 | 62.0% quartz sand | 660 | 20 | 516 | |
| 18 | 15.6% coke dust | 660 | 20 | 490 | 469.2 |
| 19 | 15.6% coal (0–1 mm.) | 660 | 20 | 539 | |
| 20 | | 660 | 20 | 370 | |
| 21 | 6.8% sulfite waste liquor | 1,000 | 20 | 207 | |
| 22 | 62.0% quartz sand | 1,000 | 20 | 220 | |
| 23 | 21.6% petroleum-coke dust | 1,000 | 20 | 199 | 222.6 |
| 24 | 9.6% coal (0–1 mm.) | 1,000 | 20 | 274 | |
| 25 | | 1,000 | 20 | 213 | |
| (b) GRANULATE | | | | | |
| 26 | 6.8% waterglass | 660 | 20 | 608 | |
| 27 | 62.0% quartz sand | 660 | 20 | 873 | |
| 28 | 10.6% coke dust | 660 | 20 | 602 | 750.8 |
| 29 | 20.6% coal (0–1 mm.) | 660 | 20 | 1,091 | |
| 30 | | 660 | 20 | 580 | |
| 31 | 6.8% waterglass | 1,000 | 20 | 354 | |
| 32 | 62.0% quartz sand | 1,000 | 20 | 302 | |
| 33 | 25.6% coke dust | 1,000 | 20 | 318 | 325.8 |
| 34 | 5.6% coal (0–1 mm.) | 1,000 | 20 | 318 | |
| 35 | | 1,000 | 20 | 337 | |

| Specimen No. | Composition of quartz-carbon shapes | Annealing temperature (° C.) | Sojourn time at annealing temperature (minutes) | Breaking load (kg.) | Average value of breaking load |
|---|---|---|---|---|---|
| (c) BRIQUETS MADE FROM CARBON, QUARTZ AND IRON | | | | | |
| 36 | 5.0% sulfite waste liquor | 660 | 20 | 193 | |
| 37 | 8.0% iron turnings <5 mm | 660 | 20 | 201 | |
| 38 | 59.0% quartz sand (0-2 mm.) | 660 | 20 | 189 | 195 |
| 39 | 14.0% coke dust (0-6 mm.) | 660 | 20 | 187 | |
| 40 | 14.0% coal (0-1 mm.) | 660 | 20 | 205 | |
| 41 | 6.0% sulfite waste liquor | 1,000 | 20 | 175 | |
| 42 | 8.0% iron turnings <5 mm | 1,000 | 20 | 185 | |
| 43 | 58.0% quartz sand (0.06-0.6 mm.) | 1,000 | 20 | 170 | 174 |
| 44 | 10.0% coke dust (0-1 mm.) | 1,000 | 20 | 165 | |
| 45 | 18.0% coal (0-6 mm.) | 1,000 | 20 | 175 | |
| 46 | 7.0% sulfite waste liquor | 660 | 20 | 208 | |
| 47 | 8.0% granulated iron (0.5-5 mm.) | 660 | 20 | 205 | |
| 48 | 58.0% quartz sand | 660 | 20 | 187 | 199 |
| 49 | 11.0% coke dust (0-6 mm.) | 660 | 20 | 217 | |
| 50 | 16.0% coal (0-1 mm.) | 660 | 20 | 185 | |

We claim:

1. In a process for producing ferrosilicon by introducing and treating quartz, carbon and iron in a reduction furnace, whereby at least the quartz and carbon components are introduced in the form of briquettes or pellets; the improvement comprising utilizing a carbon component consisting of
   (A) coal or coke having a caking capacity of about 4–10, and
   (B) non-caking coal or non-caking coke, the ratio of (A) to (B) being about 2:1 to 1:5.

2. A process as claimed in claim 1, wherein the shapes contain at least a portion of the iron turnings and are introduced jointly with the balance iron turnings into the furnace.

3. A process as claimed in claim 1, wherein the coal has a caking capacity of 5 to 7.

4. A process as claimed in claim 1, wherein the binding agent is at least one member selected from the group consisting of sulfite waste liquor and water-glass so as to enable pure ferrosilicon to be prepared.

5. A process as claimed in claim 4, wherein the sulfite waste liquor has a strength of about 34° Bé and is used in a proportion of 1.0 to 6.0% by weight.

6. A process as claimed in claim 5, wherein the sulfite waste liquor is used in a proportion of 3.0 to 5.0% by weight.

7. A process as claimed in claim 1, wherein the carbon-carrying material is used in the form of grains having a size of less than 6 mm.

8. A process as claimed in claim 7, wherein an about 50% proportion of the carbon-carrying material is used in the form of grains having a size of smaller than 1 mm., and the balance of the carbon-carrying material is used in the form of grains having a size of 1 to 6 mm.

9. A process as claimed in claim 1, wherein about half the amount of quartz is used in the form of grains having a size of smaller than 2 mm., and the balance is used in the form of grains having a size of 2–5 mm., so as to enable the shapes to be produced by granulating and briquetting under low pressure.

10. A process as claimed in claim 9, wherein the said half of the quartz is used in the form of grains having a size of smaller than 1 mm.

11. A process as claimed in claim 9, wherein the said balance grains having a size of 2–5 mm. are grains of crushed rock quartz.

12. A process as claimed in claim 1, wherein the quartz is used in the form of grains having a size of smaller than 2 mm. so as to enable the shapes to be produced under a pressure of more than 4 tons per cm. of roller width.

13. A process as claimed in claim 12, wherein an at least 50% proportion of the quartz is used in the form of grains having a size of 0.06 to 0.6 mm.

14. A process as claimed in claim 1, wherein the iron turnings are steel turnings with an edge length of smaller than 5 mm.

References Cited

UNITED STATES PATENTS

| | | | |
|---|---|---|---|
| 1,666,312 | 4/1928 | Runyan | 75—3 |
| 1,727,193 | 9/1929 | Baily | 75—129 |
| 2,010,230 | 8/1935 | Gustafsson | 75—22.5 |
| 2,261,516 | 11/1941 | Franchot | 75—135 |
| 2,878,518 | 3/1959 | Klee | 264—12 |

L. DEWAYNE RUTLEDGE, *Primary Examiner.*

J. E. LEGRU, *Assistant Examiner.*

U.S. Cl. X.R.

75—11, 130.5